Feb. 28, 1967     F. W. DOVE     3,306,572
REGULATABLE VALVE
Filed July 10, 1964
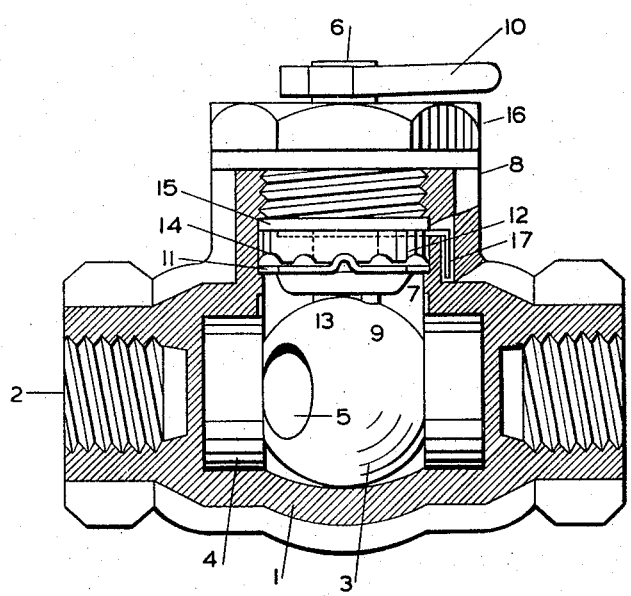
INVENTOR
FREDERICK WILLIAM DOVE
By Shoemaker and Mattare
ATTYS.

3,306,572
REGULATABLE VALVE
Frederick W. Dove, Johannesburg, Transvaal, Republic of South Africa, assignor to Glens Engineering Works (Proprietary) Limited, Johannesburg, Transvaal, Republic of South Africa
Filed July 10, 1964, Ser. No. 381,818
Claims priority, application Republic of South Africa, Aug. 2, 1963, 63/3,488
2 Claims. (Cl. 251—297)

This invention relates to valves of the type in which there is an apertured spherical plug rotatable between a pair of resilient rings and well known as a "Glen" valve.

A plug valve is often used in preference to a screw-down type of valve, because it can be fully opened and closed by the movement of a handle through only 90°, rather than having to rotate a wheel which must be screwed down to shut, or screwed up to open. Furthermore, in a screw-down valve, it is difficult to know without looking at the discharge how far the valve is opened or closed, in fact with untrained labour the wheel is often turned the wrong way in an effort to open or shut the valve.

It is the object of this invention to provide a plug cock or valve, operable by the partial rotation of a handle, with means for regulating the amount of rotation of the handle, that is, the amount of opening of the valve; which amount of said opening will be indicated by the position of the handle.

In accordance with this invention a valve, having an operating handle, an apertured spherical plug rotatable between a pair of resilient rings, is adapted to be opened or closed with the handle rotatable in steps.

This invention provides a valve comprising an inverted T-shaped body, a passage through the head of the T and a spindle housed in a recess in the leg of the T, an apertured spherical plug, in the passageway between a pair of resilient rings and rotatable with the spindle, a pair of clutch-like plates in said recess, resiliently pressed together, one plate engaged by the spindle and the other slidable thereon, but non-rotatable, and said plates restricted to slip rotatably one against the other step by step.

Other features of the invention provide for one of the clutch-like plates to be made of resilient material such as neoprene, with its surface radially serrated, and the other having at least one radial protrusion to engage said serrations and a resilient gland packing for the spindle adapted to press the clutch-like plates together.

One preferred form of the inventon is illustrated in the accompanying drawing, which is a partially sectional elevation of the complete valve.

In the drawing, as shown, the body 1 of the valve is a casting with the passageway 2 for the fluid in line therethrough. An apertured spherical plug 3, between a pair of resilient washers 4, is rotatably mounted centrally in passageway 2.

Rotation of the plug 3 brings its aperture 5 in line with the passageway 2 through the washers 4, reverse movement will of course close the valve.

A spindle 6 for rotating the plug 3, is mounted in a recess 7 in the leg 8 of the T of the body 1 of the valve. One end 9 of the spindle 6 is shaped oblong-like to fit a recess (not shown) in the top of the plug 3. The opposite end of the spnidle 6 is shaped to fit a handle 10 for turning the plug 3 to open or close the passageway 2 through the valve.

In said recess 7 for the spindle 6 is mounted a pair of clutch-like plates 11, 12. One plate 11 is secured to the spindle 6 by fitting onto the oblong-like portion 9. Conveniently, and as shown, it may be made of sheet metal.

The other plate 12 is made slidable, but not rotatable, in the recess 7. It is conveniently made of neoprene and is kept from rotating by depending lugs 17 engaging recesses in the wall of the recess 7.

The clutch-like plate 11, rotatable with the spindle 6, is made of metal and has two protrusions 13 diametrically opposite one another. The other clutch-like plate 12 is slidable in the recess 7 but non-rotatable therein, it is made of resilient material and is serrated radially, with serrations 14 having rounded tops to facilitate their passage over the protrusions 13 on the plate 11. The serrations 14 are conveniently spaced so that the plates 11, 12 hold the plug 3 in a number of positions between being fully opened or fully closed.

The spindle 6 has a gland packing 15 between its cap 16, closing the recess 7, and the clutch plates 11, 12. This packing 15 is in the form of a rubber washer and its resilience serves to load the clutch-like plates 11, 12 against each other.

With the provision of the clutch-like plates 11, 12 the plug 3 is held in different and regulatable positions in opening and closing. This arrangement not only allows the amount of opening or closing to be adjusted reliably but the fluid passing a semi-closed aperture will not be able to force the rotation of the plug 3 to increase the opening.

For example, if the cock or valve, according to this invention, is used to control the water to an air water blast, sufficient water, in proportion to the amount of air passing, can be regulated and such regulation will remain permanent, thus producing the best quality airwater blast and no waste of water will occur. If too much water is used the water is not sufficiently comminuted and the blast is not fully effective.

This invention provides a regulatable valve of the "Glen" type which is cheap and effective.

What I claim as new and desire to secure by Letters Patent is:

1. A valve comprising an inverted T-shaped body, a passage through the head of the T, an apertured spherical plug in the passage, flanked by resilient sealing rings; said plug having an integral spindle extending through the leg of the T and housed in a recess in said leg, and carrying a handle; a pair of clutch-like plates received by said spindle in said recess, resilient packing in said leg pressing said plates together, one of said plates being secured to said spindle and rotatable therewith, said one plate being supported so that such plate as a whole cannot move axially, the other of said plates being non-rotatably secured to said housing, said clutch plates having cooperating protrusions and lock cavities on their contacting faces to hold said valve in various positions of adjustment.

2. A valve as described in claim 1, wherein said resilient packing comprises a rubber washer.

References Cited by the Examiner
UNITED STATES PATENTS

| | | | |
|---|---|---|---|
| 506,991 | 10/1893 | Forstburg et al. | 251—297 X |
| 2,161,070 | 6/1939 | McDonough | 251—297 X |
| 2,217,963 | 10/1940 | Mueller | 251—297 |
| 3,198,477 | 8/1965 | Allenbaugh | 251—297 X |

FOREIGN PATENTS

| | | |
|---|---|---|
| 428,720 | 6/1911 | France. |

M. CARY NELSON, *Primary Examiner.*
R. C. MILLER, *Assistant Examiner.*